(12) United States Patent
Fujishiro et al.

(10) Patent No.: US 10,484,919 B2
(45) Date of Patent: Nov. 19, 2019

(54) RADIO TERMINAL CONFIGURED TO SWITCH A STANDBY TARGET OR A CONNECTION TARGET BETWEEN A MOBILE COMMUNICATION NETWORK AND A WIRELESS LAN

(71) Applicant: KYOCERA Corporation, Kyoto (JP)

(72) Inventors: Masato Fujishiro, Yokohama (JP); Yushi Nagasaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 142 days.

(21) Appl. No.: 15/423,903

(22) Filed: Feb. 3, 2017

(65) Prior Publication Data
US 2017/0150413 A1    May 25, 2017

Related U.S. Application Data

(63) Continuation of application No. PCT/JP2015/072239, filed on Aug. 5, 2015.

(30) Foreign Application Priority Data

Aug. 7, 2014 (JP) ................................. 2014-161776

(51) Int. Cl.
*H04W 36/00* (2009.01)
*H04W 36/14* (2009.01)
(Continued)

(52) U.S. Cl.
CPC ........... *H04W 36/14* (2013.01); *H04W 36/32* (2013.01); *H04W 48/00* (2013.01); *H04W 48/18* (2013.01); *H04W 88/06* (2013.01)

(58) Field of Classification Search
CPC ..... H04W 36/14; H04W 36/32; H04W 48/00; H04W 48/18; H04W 88/18
See application file for complete search history.

(56) References Cited

U.S. PATENT DOCUMENTS

| 8,359,034 B2 | 1/2013 | Ishii | |
|---|---|---|---|
| 2015/0351024 A1* | 12/2015 | Jang | H04W 48/18 370/329 |

(Continued)

FOREIGN PATENT DOCUMENTS

| JP | 2009-239579 A | 10/2009 |
|---|---|---|
| WO | 2009/072521 A1 | 6/2009 |

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 12); 3GPP TS 36.304 V12.1.0; Jun. 2014; pp. 1-35.

(Continued)

*Primary Examiner* — Amancio Gonzalez
(74) *Attorney, Agent, or Firm* — Studebkaer & Brackett PC

(57) ABSTRACT

A radio terminal comprises a controller configured to perform a predetermined process for switching a standby target or a connection target between a mobile communication network and a wireless LAN when at least a part of a coverage area of the wireless LAN overlaps a coverage area of the mobile communication network. The controller executes the predetermined process when a state where first information at the mobile communication network side satisfies a first condition and second information at the wireless LAN side satisfies a second condition is continued over a predetermined period. The controller determines whether or not the second information at the wireless LAN side satisfies the second condition, when a validity period set to the second information at the wireless LAN side has not expired.

2 Claims, 6 Drawing Sheets

(51) Int. Cl.
*H04W 48/00* (2009.01)
*H04W 48/18* (2009.01)
*H04W 36/32* (2009.01)
*H04W 88/06* (2009.01)

(56) References Cited

U.S. PATENT DOCUMENTS

2016/0066234 A1* 3/2016 Cho ................. H04W 36/14
 370/331
2016/0123840 A1* 5/2016 Takada .............. G01M 13/045
 702/39

OTHER PUBLICATIONS

International Search Report issued in PCT/JP2015/072239; dated Oct. 8, 2015.
3rd Generation Partnership Project; Technical Specification Group Radio Access Network; Study on WLAN/3GPP Radio Interworking (Release 12); 3GPP TR 37.834 V0.4.0; Aug. 2013; total 14 pages.
LG Electronics Inc.; "Open issues regarding interworking policy evaluation"; 3GPP TSG-RAN2 Meeting #86; R2-142597; May 19-May 23, 2014; total 3 pages; Seoul, Republic of Korea.
The extended European search report issued by the European Patent Office dated Jan. 22, 2018, which corresponds to European Patent Application No. 15828980.1-1214 and is related to U.S. Appl. No. 15/423,903.

* cited by examiner

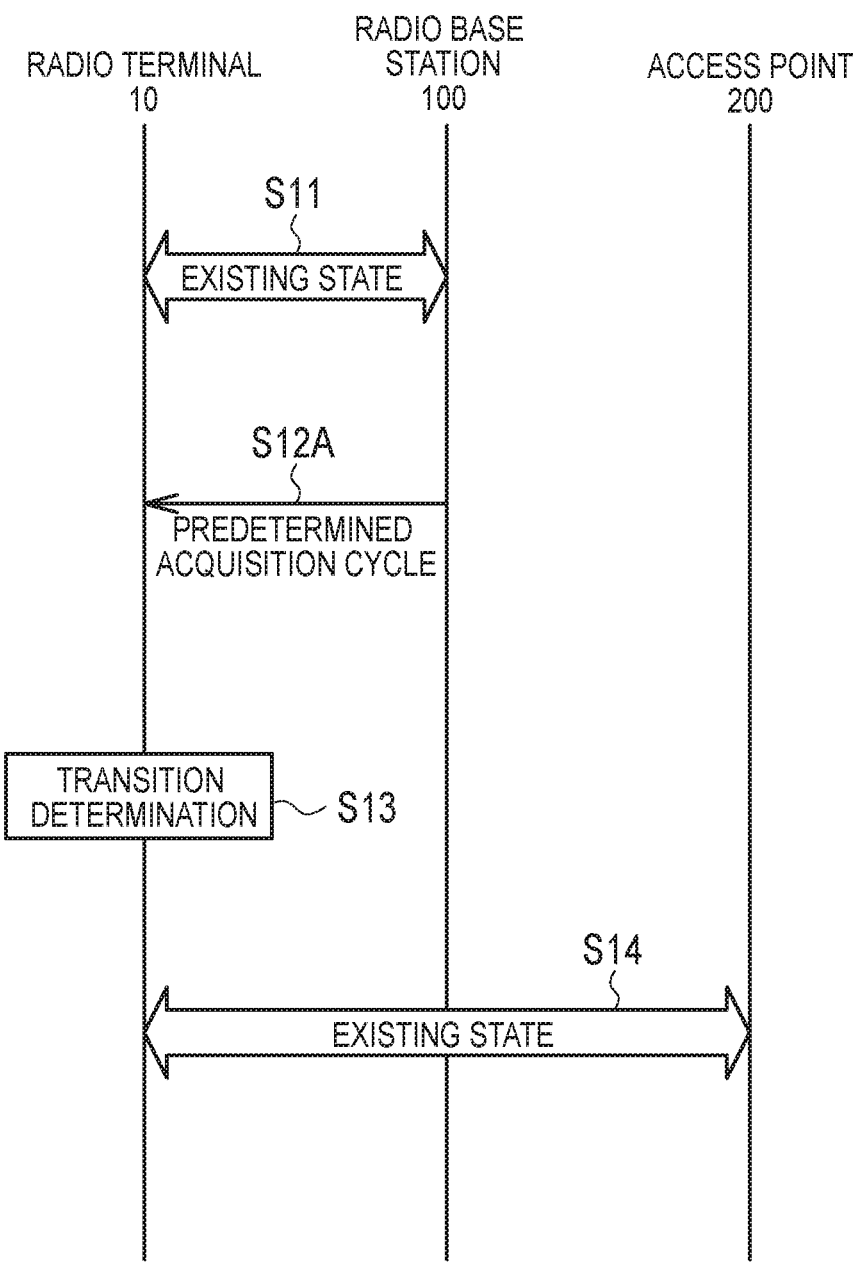

RADIO TERMINAL CONFIGURED TO SWITCH A STANDBY TARGET OR A CONNECTION TARGET BETWEEN A MOBILE COMMUNICATION NETWORK AND A WIRELESS LAN

CROSS-REFERENCE TO RELATED APPLICATION

The present application is a continuation based on PCT Application No. PCT/JP2015/072239 filed on Aug. 5, 2015, which claims the benefit of Japanese Patent Application No. 2014-161776 filed on Aug. 7, 2014, entitled "WIRELESS TERMINAL," the contents of which are incorporated by reference herein in their entirety.

TECHNICAL FIELD

The present application relates to a radio terminal configured to perform a process for switching a standby target or a connection target between a coverage area of a mobile communication network and a coverage area of a wireless LAN.

BACKGROUND ART

Conventionally, in a mobile communication network represented by an LTE (Long Term Evolution), if a measurement result of a signal received from a source cell and a target cell satisfies a predetermined condition over a constant period, transition from the source cell to the target cell (cell selection or a handover) is performed. Such a process is performed assuming that the measurement of the received signal is performed at constant intervals (for example, 3GPP Technical Specification "TS36.304 V12.1.0").

In recent years, there is proposed a switching process (a network selection or a traffic steering) of switching a standby target or a connection target between a mobile communication network and a wireless LAN if at least a part of a coverage area of the wireless LAN overlaps a coverage area of the mobile communication network. Specifically, the switching process is performed on the basis of whether or not first information at a mobile communication network side satisfies a first condition and second information at a wireless LAN side satisfies a second condition.

Here, the first information at the mobile communication network side is a measurement result (RSRPmeas) of a signal level of a received signal (RSRP: Reference Signal Received Power) and a measurement result (RSRQmeas) of a signal quality of a received signal (RSRQ: Reference Signal Received Quality), for example. The second information at the wireless LAN side is a channel utilization value of the wireless LAN, a backhaul value of the wireless LAN, a signal level of the received signal (RCPI: Received Channel Power Indicator), and a noise level of the received signal (RSNI; Received Signal Noise Indicator), for example.

SUMMARY

A radio terminal according to one embodiment comprises a controller configured to perform a predetermined process for switching a standby target or a connection target between a mobile communication network and a wireless LAN when at least a part of a coverage area of the wireless LAN overlaps a coverage area of the mobile communication network. The controller executes the predetermined process when a state where first information at the mobile communication network side satisfies a first condition and second information at the wireless LAN side satisfies a second condition is continued over a predetermined period. The controller determines whether or not the second information at the wireless LAN side satisfies the second condition, when a validity period set to the second information at the wireless LAN side has not expired.

A radio terminal according to one embodiment comprises a controller configured to perform a predetermined process for switching a standby target or a connection target between a mobile communication network and a wireless LAN when at least a part of a coverage area of the wireless LAN overlaps a coverage area of the mobile communication network. The controller executes the predetermined process when a state where first information at the mobile communication network side satisfies a first condition and second information at the wireless LAN side satisfies a second condition is continued over a predetermined period. As a cycle in which the second information at the wireless LAN side is acquired, a predetermined acquisition cycle is set.

A radio terminal according to one embodiment comprises a controller configured to perform a predetermined process for switching a standby target or a connection target from a mobile communication network to a wireless LAN when at least a part of a coverage area of the wireless LAN overlaps a coverage area of the mobile communication network. The controller executes the predetermined process when a state where first information at the mobile communication network side satisfies a first condition and second information at the wireless LAN side satisfies a second condition is continued over a predetermined period. The controller determines whether or not the second information at the wireless LAN side satisfies the second condition, after determining that the first information at the mobile communication network side satisfies the first condition.

BRIEF DESCRIPTION OF THE DRAWINGS

FIG. 8 is a sequence diagram illustrating a communication method according to the first modification.

DESCRIPTION OF THE EMBODIMENT

Figure 1:
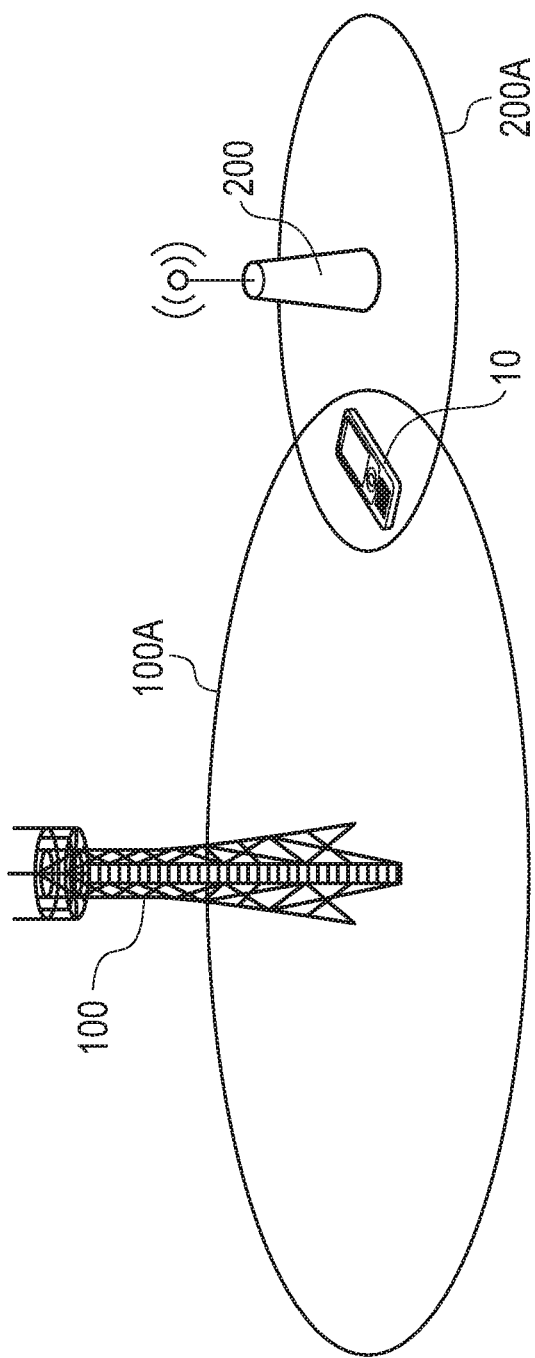
FIG. 1 is a diagram illustrating a communication system 1 according to a first embodiment.

A mobile communication method and a radio terminal according to an embodiment of the present application is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

[Overview of Embodiment]

Firstly, a radio terminal according to one embodiment comprises a controller configured to perform a predetermined process for switching a standby target or a connection target between a mobile communication network and a wireless LAN when at least a part of a coverage area of the wireless LAN overlaps a coverage area of the mobile communication network. The controller executes the predetermined process when a state where first information at the mobile communication network side satisfies a first condition and second information at the wireless LAN side satisfies a second condition is continued over a predetermined period. The controller determines whether or not the second information at the wireless LAN side satisfies the second condition, when a validity period set to the second information at the wireless LAN side has not expired.

In this way, in the embodiment, if the validity period set to the second information at the wireless LAN side has not expired, it is determined whether or not the second information at the wireless LAN side satisfies the second condition. In other words, if the validity period set to the second information at the wireless LAN side has expired, it is considered that the second information at the wireless LAN side does not satisfy the second condition. Therefore, it is possible to restrain a situation in which the switching process is executed when the very old second information is referenced to, and it is thus possible to execute an appropriate switching process.

Secondly, a radio terminal according to one embodiment comprises a controller configured to perform a predetermined process for switching a standby target or a connection target between a mobile communication network and a wireless LAN when at least a part of a coverage area of the wireless LAN overlaps a coverage area of the mobile communication network. The controller executes the predetermined process when a state where first information at the mobile communication network side satisfies a first condition and second information at the wireless LAN side satisfies a second condition is continued over a predetermined period. As a cycle in which the second information at the wireless LAN side is acquired, a predetermined acquisition cycle is set.

In this way, in the embodiment, the predetermined acquisition cycle is set as a cycle in which the second information at the wireless LAN is acquired. In other words, it is possible to determine on the basis of a sufficient number of samples (second information) whether or not a state where the second information at the wireless LAN side satisfies the second condition is continued over a predetermined period. This improves the reliability of the second information, resulting in the appropriate switching process being executed. Further, as a result, it is possible to restrain a situation in which the switching process is executed when the very old second information is referenced to, and it is thus possible to execute the appropriate switching process.

[First Embodiment]

(Communication System)

A communication system according to a first embodiment will be described, below. FIG. 1 is a diagram illustrating a communication system 1 according to the first embodiment.

As illustrated in FIG. 1, the communication system 1 includes a radio base station 100 and an access point 200. Further, the communication system 1 includes a radio terminal 10 capable of connecting to the radio base station 100 or the access point 200.

The radio terminal 10 is a terminal such as a cell phone or a tablet computer. The radio terminal 10 has a function of performing radio communication with the access point 200, in addition to a function of performing radio communication with the radio base station 100.

The radio base station 100 has a first coverage area 100A, and in the first coverage area 100A, provides a mobile communication service represented by an LTE (Long Term Evolution). The radio base station 100 manages one or a plurality of cells, and the first coverage area 100A is configured by one or a plurality of cells. The radio base station 100 is an entity of a mobile communication network. It is noted that a cell may be thought of as a term to indicate a geographical area, and may also be thought of as a function of performing radio communication with the radio terminal 10.

The access point 200 has a second coverage area 200A, and in the second coverage area 200A, provides a wireless LAN service. The access point 200 is an entity of a wireless LAN. At least a part of the second coverage area 200A overlaps the first coverage area 100A. A whole of the second coverage area 200A may overlap the first coverage area 100A. Generally, the second coverage area 200A is smaller than the first coverage area 100A.

(Application Scene)

In the first embodiment, a method of performing a switching process (for example, a network selection or a traffic steering) of switching a standby target or a connection target between a mobile communication network and a wireless LAN, will be described. Specifically, if a state is continued over a predetermined period where first information at a mobile communication network side satisfies a first condition and second information at a wireless LAN side satisfies a second condition, the switching process (for example, a network selection or a traffic steering) is executed.

In the first embodiment, the switching process includes both of: a process of switching a standby target or a connection target from the mobile communication network to the wireless LAN, and a process of switching a standby target or a connection target from the wireless LAN to the mobile communication network.

Here, the first information at the mobile communication network side is a measurement result (RSRPmeas) of a signal level of a received signal (RSRP: Reference Signal Received Power) and a measurement result (RSRQmeas) of a signal quality of a received signal (RSRQ: Reference Signal Received Quality), for example.

The second information at the wireless LAN side is a channel utilization value of the wireless LAN (ChannelUtilizationWLAN), a backhaul value of a downlink of the wireless LAN (BackhaulRateDlWLAN), a backhaul value of an uplink of the wireless LAN (BackhaulRateUlWLAN), a signal level of a received signal (RCPI: Received Channel Power Indicator), and a noise level of a received signal (RSNI; Received Signal Noise Indicator), for example.

(Switching Process from Mobile Communication Network to Wireless LAN)

A first condition that the standby target or the connection target is switched from the mobile communication network to the wireless LAN is that either one of the following condition (1a) or (1b) is satisfied, for example. It is noted that the first condition may be that all of the following conditions (1a) to (1b) are satisfied.

$$\text{RSRPmeas} < \text{Thresh}_{ServingOffloadWLAN,LowP} \quad (1a)$$

$$\text{RSRQmeas} < \text{Thresh}_{ServingOffloadWLAN,LowQ} \quad (1b)$$

It is noted that "$\text{Thresh}_{ServingOffloadWLAN,\ LowP}$" and "$\text{Thresh}_{ServingOffloadWLAN,\ LowQ}$" are threshold values provided from the upper layer or previously determined threshold values.

A second condition that the standby target or the connection target is switched from the mobile communication network to the wireless LAN is that all of the following conditions (1c) to (1g) are satisfied, for example. It is noted that the second condition may be that any one of the following conditions (1c) to (1g) is satisfied.

$$\text{ChannelUtilizationWLAN} < \text{Thresh}_{ChUtilWLAN,Low} \quad (1c)$$

$$\text{BackhaulRateDlWLAN} > \text{Thresh}_{BackhRateDLWLAN,High} \quad (1d)$$

$$\text{BackhaulRateUlWLAN} > \text{Thresh}_{BackhRateULWLAN,High} \quad (1e)$$

$$\text{RCPI} > \text{Thresh}_{RCPIWLAN,High} \quad (1f)$$

$$\text{RSNI} > \text{Thresh}_{RSNIWLAN,High} \quad (1g)$$

It is noted that "$\text{Thresh}_{ChUtilWLAN,\ Low}$", "$\text{Thresh}_{BackhRateDLWLAN,\ High}$", "$\text{Thresh}_{BackhRateULWLAN,\ High}$", "$\text{Thresh}_{RCPIWLAN,\ High}$", and "$\text{Thresh}_{RSNIWLAN,\ High}$" are threshold values provided from the upper layer or previously determined threshold values.

(Switching Process from Wireless LAN to Mobile Communication Network)

A first condition that the standby target or the connection target is switched from the wireless LAN to the mobile communication network is that the following conditions (2a) and (2b) are satisfied, for example. It is noted that the first condition may be that either one of the following condition (2a) or (2b) is satisfied.

$$\text{RSRPmeas} > \text{Thresh}_{ServingOffloadWLAN,HighP} \quad (2a)$$

$$\text{RSRQmeas} > \text{Thresh}_{ServingOffloadWLAN,HighQ} \quad (2b)$$

It is noted that "$\text{Thresh}_{ServingOffloadWLAN,\ HighP}$" and "$\text{Thresh}_{ServingOffloadWLAN,\ HighQ}$" are threshold values provided from the upper layer or previously determined threshold values.

A second condition that the standby target or the connection target is switched from the wireless LAN to the mobile communication network is that any one of the following conditions (2c) to (2g) is satisfied, for example. It is noted that the second condition may be that all of the following conditions (2c) to (2g) are satisfied.

$$\text{ChannelUtilizationWLAN} > \text{Thresh}_{ChUtilWLAN,High} \quad (2c)$$

$$\text{BackhaulRateDlWLAN} < \text{Thresh}_{BackhRateDLWLAN,Low} \quad (2d)$$

$$\text{BackhaulRateUlWLAN} < \text{Thresh}_{BackhRateULWLAN,Low} \quad (2e)$$

$$\text{RCPI} < \text{Thresh}_{RCPIWLAN,Low} \quad (2f)$$

$$\text{RSNI} < \text{Thresh}_{RSNIWLAN,Low} \quad (2g)$$

It is noted that "$\text{Thresh}_{ChUtilWLAN,\ High}$", "$\text{Thresh}_{BackhRateDLWLAN,\ Low}$", "$\text{Thresh}_{BackhRateULWLAN,\ Low}$", "$\text{Thresh}_{RCPIWLAN,\ Low}$", and "$\text{Thresh}_{RSNIWLAN,\ Low}$" are threshold values provided from the upper layer or previously determined threshold values.

It is noted that if the above-described threshold values are not provided, the radio terminal 10 may omit acquisition (i.e., reception or measurement) of information in which the threshold values are not provided.

(Radio Terminal)

Figure 2:
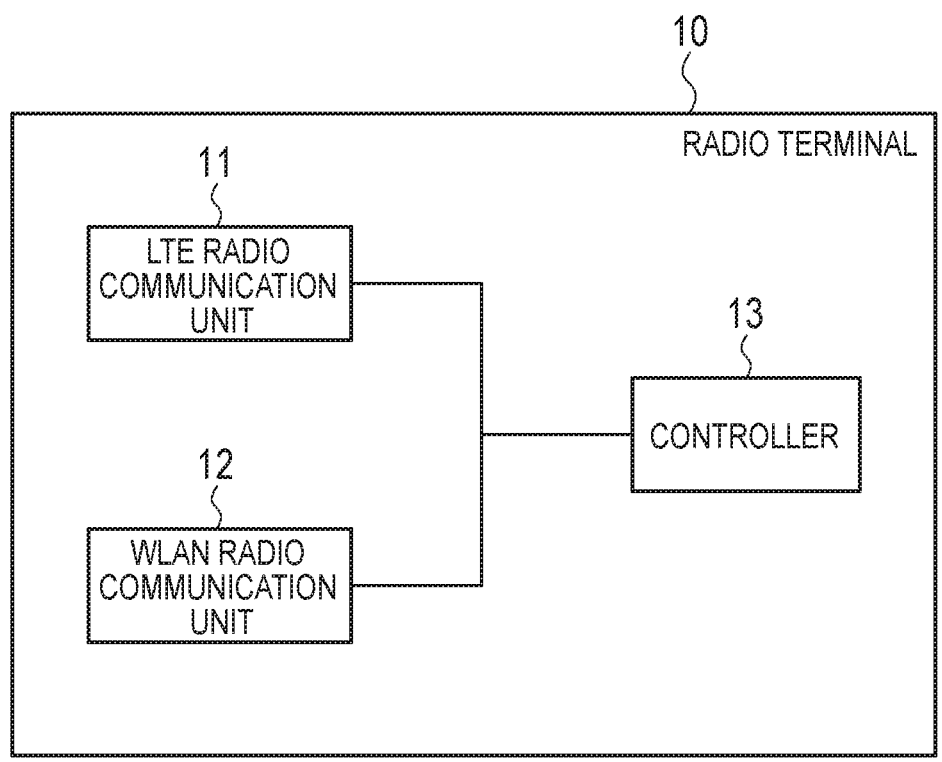
FIG. 2 is a block diagram illustrating a radio terminal 10 according to the first embodiment.

A radio terminal according to the first embodiment will be described, below. FIG. 2 is a block diagram illustrating the radio terminal 10 according to the first embodiment.

As illustrated in FIG. 2, the radio terminal 10 includes an LTE radio communication unit 11, a WLAN radio communication unit 12, and a controller 13.

The LTE radio communication unit 11 has a function of performing radio communication with the radio base station 100. For example, the LTE radio communication unit 11 regularly receives a reference signal from the radio base station 100. The LTE radio communication unit 11 regularly measures a signal level of a reference signal (RSRP) and a signal quality of a reference signal (RSRP).

In the first embodiment, the LTE radio communication unit 11 receives from the radio base station 100 a validity period that should be set to the second information. The validity period that should be set to the second information may be included in a message such as RRC Connection Reconfiguration transmitted from the radio base station 100. Alternatively, the validity period that should be set to the second information may be included in SIB (WLAN-OffloadConfig-r12) transmitted from the radio base station 100.

The validity period set to the second information may be a single value regardless of the type of the second information. Alternatively, the validity period set to the second information may be a different value depending on each type of the second information. The second information is a channel utilization value of the wireless LAN (ChannelUtilizationWLAN), a backhaul value of a downlink of the wireless LAN (BackhaulRateDlWLAN), a backhaul value of an uplink of the wireless LAN (BackhaulRateUlWLAN), a signal level of a received signal (RCPI), and a noise level of a received signal (RSNI), as described above.

The WLAN radio communication unit 12 has a function of performing radio communication with the access point 200. For example, the WLAN radio communication unit 12 receives a beacon or probe response from the access point 200. The beacon or probe response includes a BBS Load information element, and the channel utilization value of the wireless LAN (ChannelUtilizationWLAN) may be acquired from the BBS Load information element.

The WLAN radio communication unit 12 receives, in response to a request (GAS (Generic Advertisement Service) Request) for the access point 200, a response (GAS Response) returned from the access point 200. The response (GAS Response) includes a backhaul value of a downlink of the wireless LAN (BackhaulRateDlWLAN) and a backhaul value of an uplink of the wireless LAN (BackhaulRateUlWLAN). Such an inquiry procedure is performed in accordance with ANQP (Access Network Query Protocol) defined in Hotspot2.0 of WFA (Wi-Fi Alliance).

The WLAN radio communication unit 12 receives a signal from the access point 200. The WLAN radio communication unit 12 measures the signal level of the received signal (RCPI) and the noise level of the received signal (RSNI). The signal level of the received signal (RCPI) is an indicator indicating a total channel power of a received frame (a signal power, a noise power, and an interference power). The noise level (RSNI) is an indicator indicating a ratio of the signal power of the received frame relative to a total value of the noise power and the interference power of the received frame.

The controller 13 controls the radio terminal 10. Specifically, if a state is continued over a predetermined period where the first information at a mobile communication network side satisfies the first condition and the second information at a wireless LAN side satisfies the second condition, the controller 13 executes a switching process of switching the standby target or the connection target between the mobile communication network and the wireless LAN.

In the first embodiment, if the validity period set to the second information of the wireless LAN side has not expired, the controller 13 determines whether or not the second information of the wireless LAN side satisfies the second condition. In other words, if the validity period set to the second information at the wireless LAN side has expired, the controller 13 considers that the second information at the wireless LAN side does not satisfy the second condition. The validity period that should be set to the second information is notified from the radio base station 100, as described above.

Specifically, the controller 13 has a timer (Validity timer) for measuring the validity period. The timer may be a timer for measuring a time by counting up, and may be a timer for measuring a time by counting down. The controller 13 resets the timer in response to acquisition (i.e., reception or measurement) of the second information. Alternatively, the controller 13 may reset the timer in response to a predetermined number of times of acquisitions (i.e., receptions or measurements) of the second information.

The controller 13 may have a different timer depending on each type of the second information if the validity period set to the second information is a different value depending on each type of the second information. In such a case, the controller 13 resets, in response to the acquisition of the second information, the timer corresponding to the acquired second information.

The controller 13 may have a single timer if the validity period set to the second information is a single value regardless of the type of the second information. In such a case, the controller 13 preferably resets the timer in response to all the acquisitions of a plurality of types of second information. However, the controller 13 may reset the timer in response to any one acquisition of the plurality of types of second information.

The controller 13 may have a different timer depending on each type of the second information even if the validity period set to the second information is a single value regardless of the type of the second information. In such a case, the controller 13 resets, in response to the acquisition of the second information, the timer corresponding to the acquired second information.

(Determination of Switching Process)

Determination of the switching process will be described by using, as an example, a process of switching from the mobile communication network to the wireless LAN, below.

Figure 3:
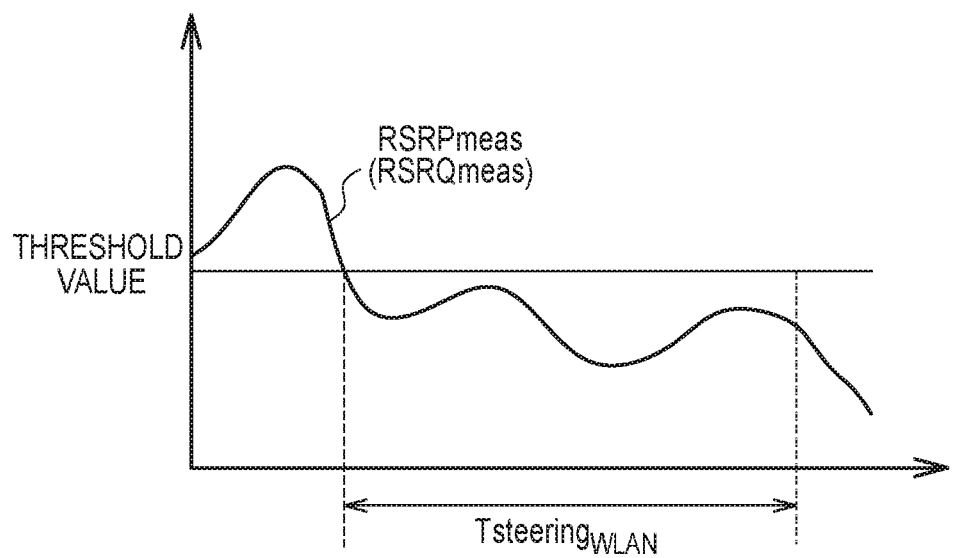
FIG. 3 is a diagram for describing a determination (mobile communication network side) of a switching process according to the first embodiment.

Firstly, a method of determining whether or not a state where the first information satisfies the first condition is continued over a predetermined period will be described. The first information is a measurement result (RSRPmeas) of a signal level (RSRP) of a reference signal or a measurement result (RSRQmeas) of a signal quality (RSRP) of a reference signal, the reference signal is received regularly in a short cycle, and the RSRPmeas or the RSRQmeas is measured in a relatively short cycle. That is, as illustrated in FIG. 3, the RSRPmeas or the RSRQmeas is acquired continuously in a time-axis direction. Therefore, it is possible to highly accurately determine whether or not a state where the first information satisfies the first condition is continued over a predetermined period (Tsteering$_{WLAN}$).

Figure 4:
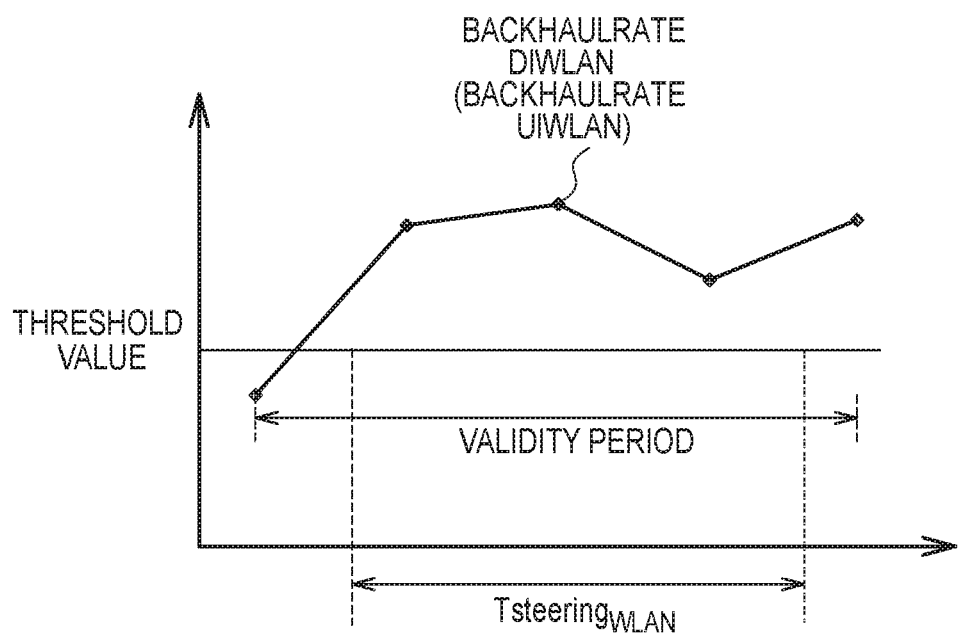
FIG. 4 is a diagram for describing a determination (wireless LAN side) of a switching process according to the first embodiment.

Secondly, a method of determining whether or not a state where the second information satisfies the second condition is continued over a predetermined period will be described. There is no fixed rule about a cycle in which the second information is acquired. That is, as illustrated in FIG. 4, the second information (for example, BackhaulRateDlWLAN or BackhaulRateUlWLAN) is acquired discretely in the time-axis direction. Therefore, it is not possible to highly accurately determine whether or not a state where the second information satisfies the second condition is continued over a predetermined period (Tsteering$_{WLAN}$).

Therefore, in the first embodiment, a concept of the validity period set to the second information is introduced, and if the valid period set to the second information at the wireless LAN side has not expired, whether or not the second information at the wireless LAN side satisfies the second condition is determined. In other words, if the validity period set to the second information at the wireless LAN side has expired, it is considered that the second information at the wireless LAN side does not satisfy the second condition.

As illustrated in FIG. 4, if there are a plurality of samples as the second information to be referred to when determining whether or not the second information satisfies the second condition, and if the validity period set to the oldest second information has not expired, whether or not the second information satisfies the second condition may be determined.

Although not particularly limited, it should be noted that BackhaulRateDlWLAN and BackhaulRateUlWLAN, which are parameters actively acquired by the radio terminal 10, are highly likely acquired dispersedly in the time-axis direction.

(Communication Method)

Figure 5:
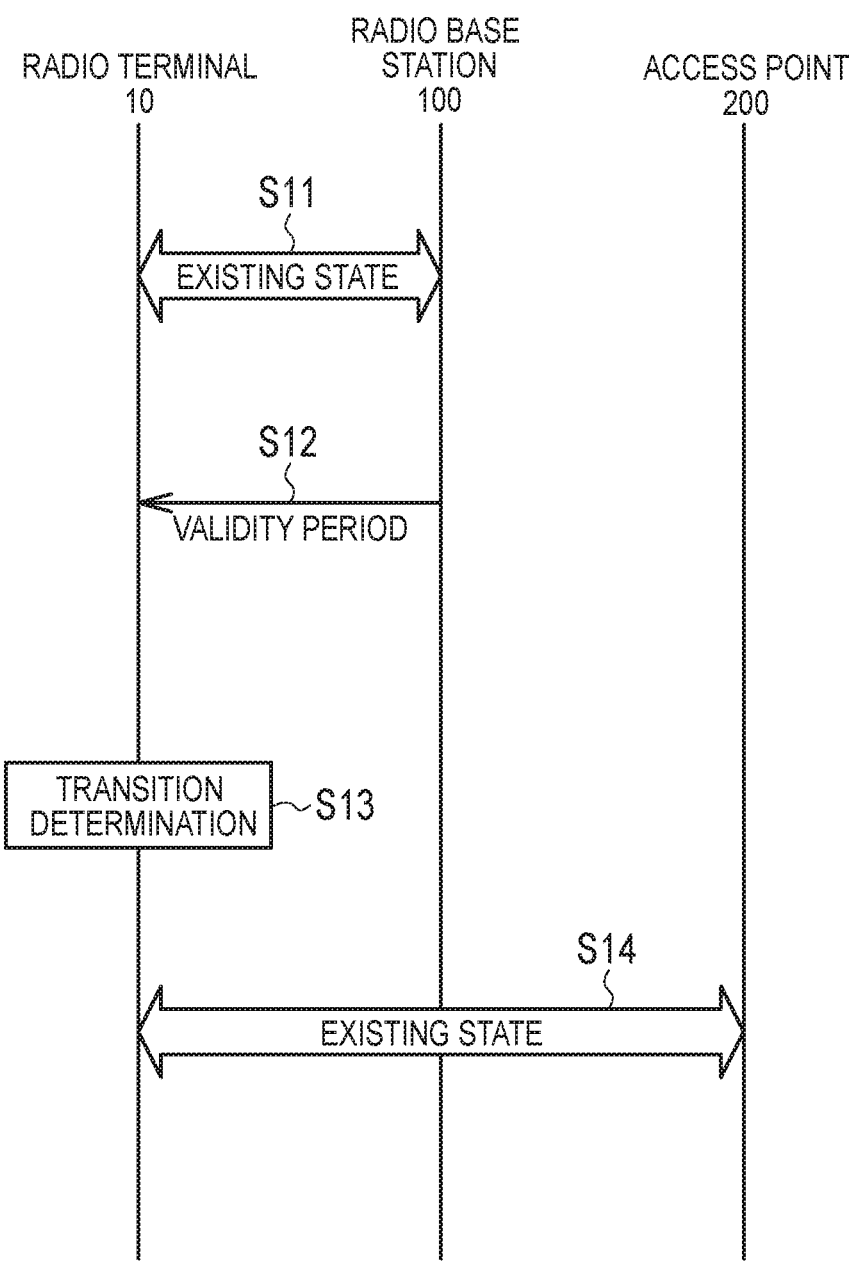
FIG. 5 is a sequence diagram illustrating a communication method according to the first embodiment.

A communication method according to the first embodiment will be described, below. FIG. 5 is a sequence diagram illustrating the communication method according to the first embodiment. Here, as an example, the process of switching from the mobile communication network to the wireless LAN will be described.

As illustrated in FIG. 5, in step S11, the radio terminal 10 exists in the radio base station 100. "Existing" may include a standby state (RRC idle state) for a cell managed by the radio base station 100 and a connected state (RRC connected state) where the radio terminal 10 is connected to the cell managed by the radio base station 100.

In step S12, the radio base station 100 notifies the radio terminal 10 of the validity period that should be set to the second information. The validity period that should be set to the second information may be included in a message such as RRC Connection Reconfiguration transmitted from the radio base station 100. Alternatively, the validity period that should be set to the second information may be included in SIB (WLAN-OffloadConfig-r12) transmitted from the radio base station 100.

In step S13, the radio terminal 10 determines whether or not a state where the first information at the mobile communication network side satisfies the first condition and the second information at the wireless LAN side satisfies the second condition is continued over a predetermined period.

Here, as described above, if the validity period set to the second information at the wireless LAN side has not expired, the radio terminal 10 determines whether or not the second information at the wireless LAN side satisfies the second condition. In other words, if the validity period set to the second information at the wireless LAN side has expired, the radio terminal 10 considers that the second information at the wireless LAN side does not satisfy the second condition.

Here, description proceeds with an assumption that the first condition and the second condition are satisfied over a predetermined period.

In step S14, the radio terminal 10 executes a switching process from the mobile communication network to the wireless LAN. Accordingly, the radio terminal 10 exists in the access point 200. "Existing" may include a standby state for the access point 200 and a connected state in connection to the access point 200.

In the first embodiment, if the validity period set to the second information at the wireless LAN side has not expired, the radio terminal 10 determines whether or not the second information at the wireless LAN side satisfies the second condition. In other words, if the validity period set to the second information at the wireless LAN side has expired, the radio terminal 10 considers that the second information at the wireless LAN side does not satisfy the second condition. Therefore, it is possible to restrain a situation in which the switching process is executed when the very old second information is referenced to, and it is thus possible to execute an appropriate switching process.

[First Modification]

A first modification of the first embodiment will be described, below. Description proceeds with a focus on a difference from the first embodiment, below.

Specifically, in the first embodiment, the validity period is set to the second information. On the other hand, in the first modification, a predetermined acquisition cycle is set as a cycle in which the second information is acquired.

The predetermined acquisition cycle set to the second information may be a single value regardless of the type of the second information. Alternatively, the predetermined acquisition cycle set to the second information may be a different value depending on each type of the second information. The second information is a channel utilization value of the wireless LAN (ChannelUtilizationWLAN), a backhaul value of a downlink of the wireless LAN (BackhaulRateDlWLAN), a backhaul value of an uplink of the wireless LAN (BackhaulRateUlWLAN), a signal level of a received signal (RCPI), and a noise level of a received signal (RSNI), as described above.

(Determination of Switching Process)

Figure 6:
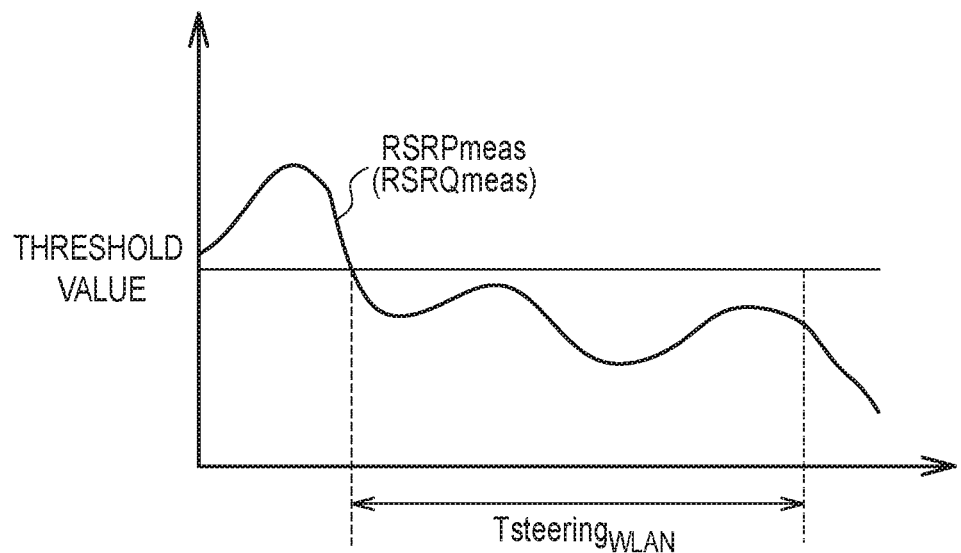
FIG. 6 is a diagram for describing a determination (mobile communication network side) of a switching process according to a first modification.
Figure 7:
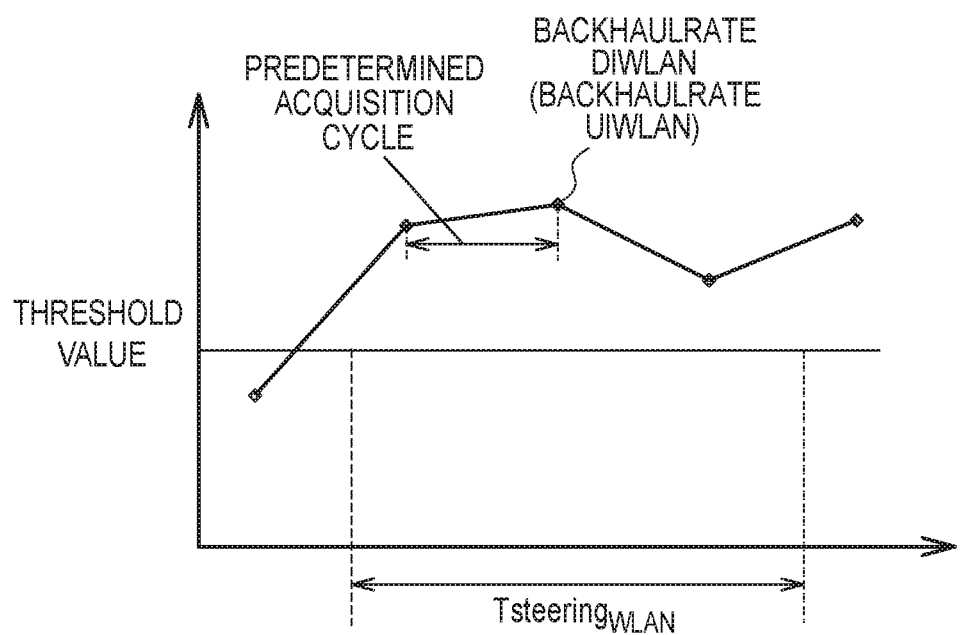
FIG. 7 is a diagram for describing a determination (wireless LAN side) of a switching process according to the first modification.

Determination of the switching process will be described by using, as an example, a process of switching from the mobile communication network to the wireless LAN, below. FIG. 6 and FIG. 7 are similar to FIG. 3 and FIG. 4 described above, and therefore an overlapped portion will not be described.

In the first modification, as illustrated in FIG. 7, a concept of the predetermined acquisition cycle set to the second information is introduced, and on the basis of the second information acquired in the predetermined acquisition cycle, whether or not a state where the second information satisfies the second condition is continued over a predetermined period is determined.

Although not particularly limited, it should be noted that BackhaulRateDlWLAN and BackhaulRateUlWLAN, which are parameters actively acquired by the radio terminal 10, are highly likely acquired dispersedly in the time-axis direction.

(Communication Method)

A communication method according to the first modification will be described, below. FIG. 8 is a sequence diagram illustrating the communication method according to the first modification. Here, as an example, the process of switching from the mobile communication network to the wireless LAN will be described. FIG. 8 is similar to FIG. 6, and therefore an overlapped portion will not be described.

In step S12A, the radio base station 100 notifies the radio terminal 10 of the predetermined acquisition cycle that should be set to the second information. The predetermined acquisition cycle that should be set to the second information may be included in a message such as RRC Connection Reconfiguration transmitted from the radio base station 100. Alternatively, the predetermined acquisition cycle that should be set to the second information may be included in SIB (WLAN-OffloadConfig-r12) transmitted from the radio base station 100.

In step S13, the radio terminal 10 determines whether or not a state where the first information at the mobile communication network side satisfies the first condition and the second information at the wireless LAN side satisfies the second condition is continued over a predetermined period.

Here, as described above, on the basis of the second information acquired in the predetermined acquisition cycle, the radio terminal 10 determines whether or not a state where the second information satisfies the second condition is continued over a predetermined period.

In the first modification, the predetermined acquisition cycle is set as a cycle in which the second information at the wireless LAN is acquired. In other words, it is possible to determine on the basis of a sufficient number of samples (second information) whether or not a state where the second information at the wireless LAN side satisfies the second condition is continued over a predetermined period. This improves the reliability of the second information, resulting in the appropriate switching process being executed. Further, as a result, it is possible to restrain a situation in which the switching process is executed when the very old second information is referenced to, and it is thus possible to execute the appropriate switching process.

[Second Modification]

A second modification of the first embodiment will be described, below. Description proceeds with a focus on a difference from the first embodiment, below.

Although not particularly mentioned in the first embodiment, in the second modification, in the switching process of switching the standby target or the connection target from the mobile communication network to the wireless LAN, the radio terminal 10 determines whether or not the second information at the wireless LAN side satisfies the second condition, after determining that the first information at the mobile communication network side satisfies the first condition.

In the second modification, the radio terminal 10 determines whether or not the second information at the wireless LAN side satisfies the second condition, after determining that the first information at the mobile communication network side satisfies the first condition. Therefore, it is possible to restrain a situation where a determination of whether or not the second information satisfies the second condition is performed in a parallel processing manner even in a case where the first information does not satisfy the first condition, resulting in the determination of whether or not the second information satisfies the second condition being wasted.

[Other Embodiments]

The present application is described through the above-described embodiments, but it should not be understood that this application is limited by the statements and the drawings constituting a part of this disclosure. From this disclosure, various alternative embodiments, examples, and operational technologies will become apparent to those skilled in the art.

In the embodiment, the valid period or the acquisition cycle that should set to the second information is notified from the radio base station 100. However, the embodiment is not limited thereto. The validity period or the acquisition cycle that should be set to the second information may be previously determined in the communication system 1.

In the first embodiment and the first modification, description proceeded with a focus on the switching process of switching the standby target or the connection target from the mobile communication network to the wireless LAN. However, the embodiment is not limited thereto. It is possible to apply the first embodiment and the first modification to the switching process of switching the standby target or the connection target from the wireless LAN to the mobile communication network.

In the embodiment, the LTE is mentioned as an example of the mobile communication network. However, the embodiment is not limited thereto. It may suffice that the mobile communication network is a network provided by a communication carrier. Therefore, the mobile communication network may be Release 99 or may be GSM (registered trademark).

In the embodiment, description proceeded with an example that if a state is continued over a predetermined period where the first information at the mobile communication network side satisfies the first condition and the second information at the wireless LAN side satisfies the second condition, the radio terminal 10 performs a switching process (for example, a network selection or a traffic steering) of switching the standby target or the connection target between the mobile communication network and the wireless LAN. However, the radio terminal 10 may perform, as a predetermined process, a reporting process to the radio base station 100 instead of the switching process (for example, a network selection or a traffic steering). Specifically, if a state is continued over a predetermined period where the first information at the mobile communication network side satisfies the first condition and the second information at the wireless LAN side satisfies the second condition, the radio terminal 10 transmits to the radio base station 100 a measurement report on the wireless LAN (and/or the mobile communication network). The radio base station 100 transmits to the radio terminal 10, on the basis of the measurement report from the radio terminal 10, a switching instruction to instruct switching between the mobile communication network and the wireless LAN. The radio terminal 10 performs the switch between the mobile communication network and the wireless LAN, in response to reception of the switching instruction from the radio base station 100. Alternatively, on the basis of the measurement report from the radio terminal 10, the radio base station 100 may instruct the radio terminal 10 to perform simultaneous communication (WLAN Aggregation) in which the radio terminal 10 simultaneously performs communication with the mobile communication network and communication with the wireless LAN. In this case, the radio terminal 10 switches part of data from the mobile communication network to the wireless LAN to perform the WLAN Aggregation communication, in response to reception of the switching instruction from the radio base station 100.

INDUSTRIAL APPLICABILITY

The present application is useful in the field of communication.

The invention claimed is:
1. A radio terminal comprising:
a controller configured to perform a predetermined process for switching a standby target or a connection target between a mobile communication network and a wireless LAN when at least a part of a coverage area of the wireless LAN overlaps a coverage area of the mobile communication network, wherein
the controller is further configured to execute the predetermined process when a state where first information regarding the mobile communication network satisfies a first condition and second information regarding the wireless LAN satisfies a second condition is continued over a predetermined period, and
the controller is further configured to
receive a validity period set to the second information from an entity at the mobile communication network,
start a timer corresponding to the validity period, in response to obtaining the second information from the wireless LAN, and
determine, before the timer expires, whether or not the second information satisfies the second condition.
2. The radio terminal according to claim 1, wherein
the first information includes a first measurement result regarding the mobile communication network,
the second information includes a second measurement result regarding the wireless LAN, and
the controller is further configured to
perform measurement for the wireless LAN to obtain the second measurement result,
start the timer corresponding to the validity period in response to obtaining the second measurement result, and
determine, before the timer expires, whether or not the second measurement result satisfies the second condition.

* * * * *